INVENTOR.
Wendell P. Cropper

INVENTOR.
Wendell P. Cropper

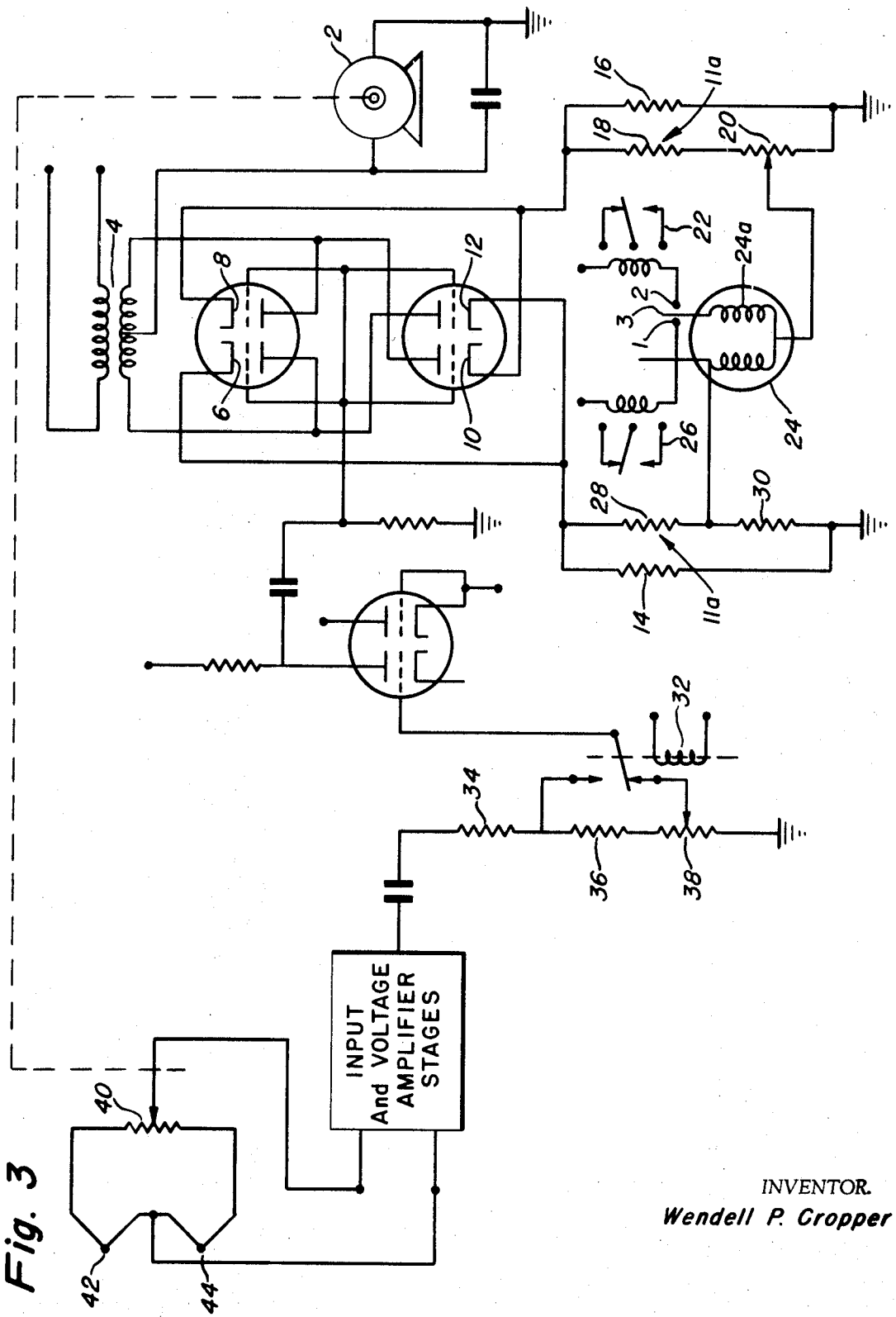

United States Patent Office 3,523,233
Patented Aug. 4, 1970

3,523,233
THERMOCOUPLE CONTROL APPARATUS INCLUDING A SERVO CONTROLLED CALIBRATING MODE AND A MEASUREMENT MODE DETECTING LOW LEVEL SIGNALS
Wendell P. Cropper, Olympia Fields, Ill., assignor to Standard Oil Company, Chicago, Ill., a corporation of Indiana
Filed Dec. 27, 1965, Ser. No. 516,355
Int. Cl. G05d 23/22
U.S. Cl. 318—619
6 Claims

ABSTRACT OF THE DISCLOSURE

Disclosed is a multifunction circuit which is operable between a high gain and low gain amplification mode. In the high gain mode, a servomotor is actuated to balance a thermocouple bridge for zero calibration. In the low gain mode a meter relay is actuated in accordance with the polarity of the signal from the thermocouple.

This invention relates to electrical measuring and detection systems and more particularly to an improved amplifier for use in a measuring and detection system.

It has been discovered that the power output stage of a conventional Brown amplifier may be modified to provide for a highly stable amplifier which may be used to drive a servomotor for rebalancing or perform as a signal amplifier with a bridge as a null-detector. If it is desired to use the amplifier both ways, it is merely necessary to make provision for gain switching. This will be explained further in the appended figures and the description accompanying them.

Further, the invention provides a circuit which is suitable for small millivolt signals because of the inherently high gain of the Brown amplifier. Although the amplifier saturates at relatively small input signals, it is reasonably linear below saturation. Therefore, with a bridge in the power output stages, it becomes a very sensitive null-detector. In this type of circuit the fact that the amplifier saturates is not necessarily a disadvantage. If the null-detector is a sensitive meter, and the saturation drives the meter only to the scale limits, the meter is automatically protected against excessive input voltages.

Briefly stated, the invention is the modification of the power output stage of a conventional Brown amplifier to drive a servomotor for rebalancing action, comprising: resistor means connected to the cathode circuit of the amplifier; a bridge network shunted across the resistor means; meter relay means having lower- and upper-limit contacts connected across the bridge adapted to provide a bridge output indication; and relay means connected to the meter relay means adapted to provide contact closures when either the lower-limit or the upper-limit contacts of the meter relay means are engaged. The amplifier in accordance with the invention may also be used as a signal amplifier with the bridge as a null-detector. Further by providing gain switching means the amplifier of this invention may be used both as a signal amplifier and for driving a servomotor for rebalancing action.

The full nature of the invention will be more readily understood from the accompanying drawings and the following description and claims:

FIG. 3 is a schematic diagram illustrating the use of the invention in one particular embodiment. It is not intended that the invention be limited to this application as many other applications are possible and would be obvious to one skilled in the art.

Figure 1:
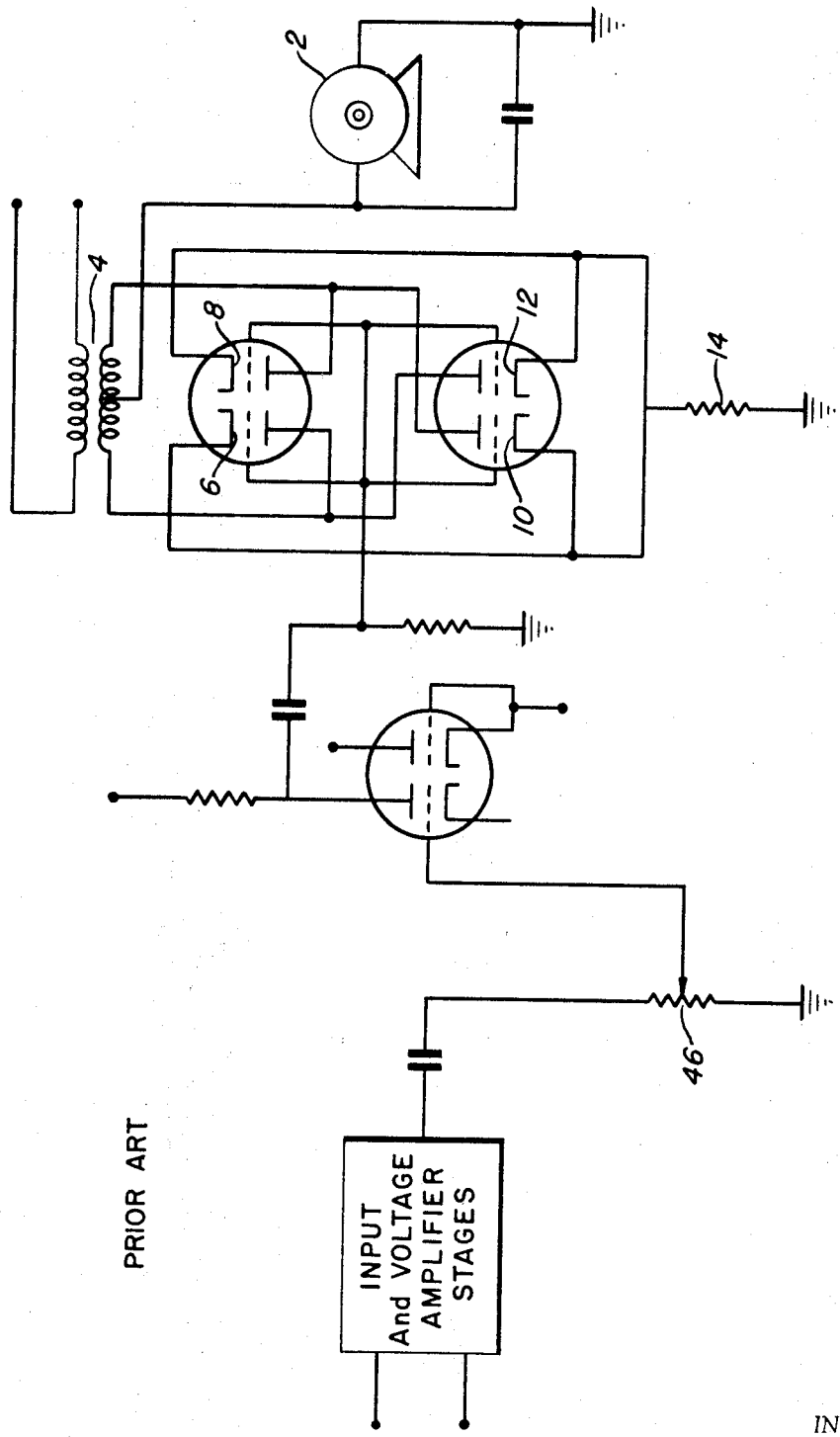
FIG. 1 is a partial schematic diagram of a conventional Brown amplifier.

In FIG. 1, the power output stage of a conventional Brown amplifier is shown in detail consisting of triodes 6, 8, 10, and 12, along with output transformer 4, servomotor 2, and cathode resistor 14. Using FIG. 1 for reference, the modifications to the amplifier in accordance with the invention will be more readily understood. The other components shown in FIG. 1 are found in the conventional amplifier of the Brown type.

Figure 2:
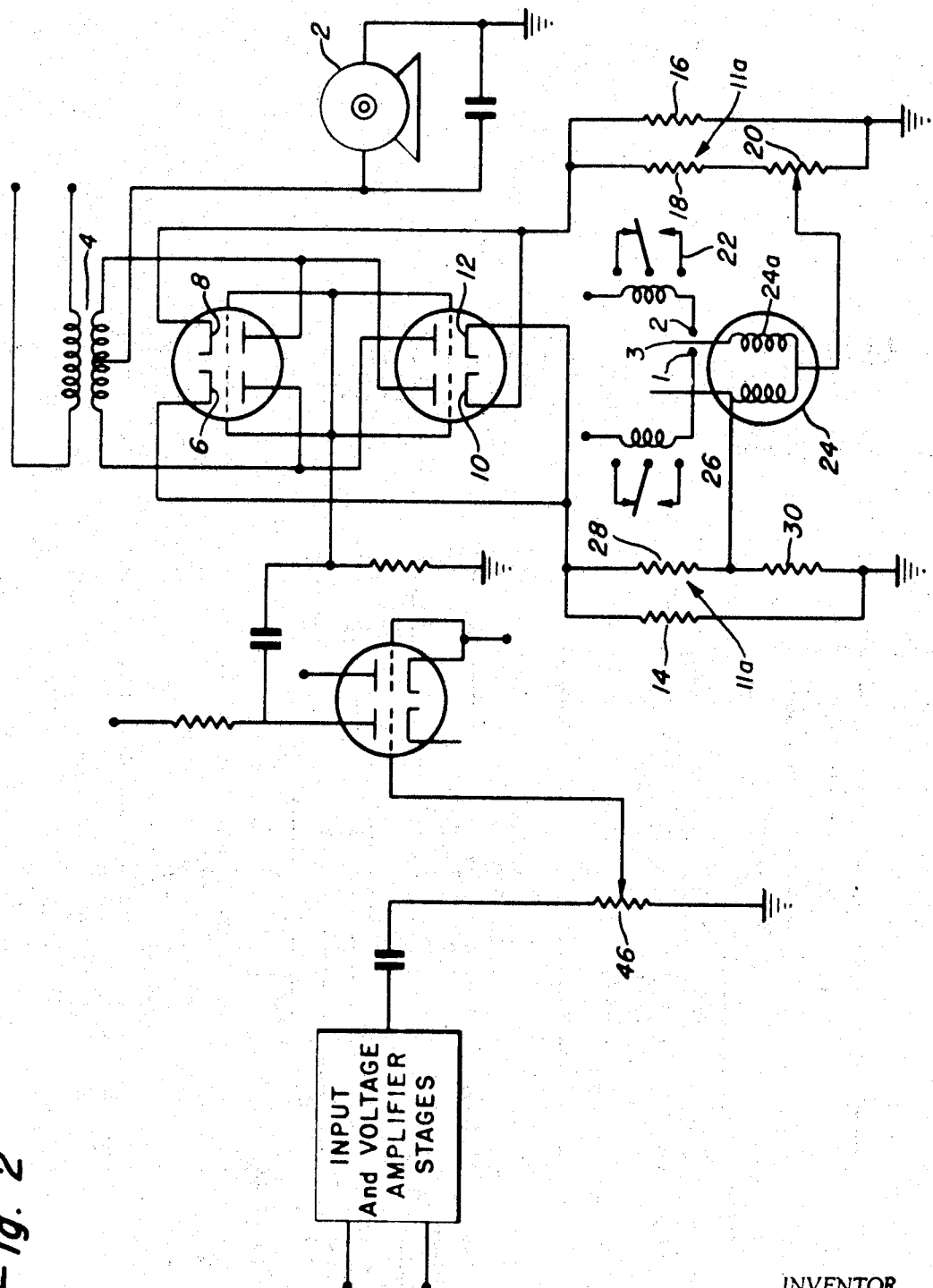
FIG. 2 is a partial schematic diagram of a conventional Brown amplifier illustrating the modifications to the power output stage in accordance with the invention.

The modifications, in accordance with this invention, to be performed on the amplifier are illustrated in FIG. 2. Modification of the output circuit consists of opening the common cathode connection and adding resistor 16 in the cathode circuit of triodes 8 and 10. Resistor 14 (the original cathode resistor) is connected to the cathodes of triodes 6 and 12. A limiting resistor network 11a consisting of resistors 28, 30, 18, 20 is shunted across cathode resistors 14 and 16. The effect of the resistor network 11a on amplifier performance is negligible because the resistance of 14 and 16 is 150 ohms each, and the series combination of 28 and 30 is 4100 ohms. The resistance of resistor 18 in series with resistor 20 yields a total resistance of 4500 ohms. Meter 24 having coil 24a and relay contacts 1 and 2, which has a +2.5–0–2.5 millivolt scale, is connected across the resistor network 11a to provide an output indication. Resistor 20 is used to adjust output voltage to zero with the amplifier input shorted. This is a stable adjustment. Readjustment will not be required unless tube replacements or other repairs are made on the amplifier. Relays 22 and 26 are placed in the locking coil circuit 24a of the meter. These relays 22 and 26 provide contact closures when either the lower-limit 1 or the upper-limit 2 contacts of meter relay 24 are engaged.

FIG. 3 describes the operation of the amplifier of the invention in one possible embodiment. The embodiment described is a measuring and readout system of an instrument used for determining the amount of carbon on a catalyst.

FIG. 3 shows how the circuit of FIG. 2 was modified for use in the carbon-on-catalyst instrument. Resistor 46 was replaced with the series combination of resistors 34, 36, and variable resistor 38. This resistor combination is a voltage divider network which is used to adjust gain of the amplifier. Relay 32 controls amplifier gain by switching from the slider of 38 to the tap between resistors 34 and 36.

Operation of the modified amplifier circuit for detection of thermocouple signals can now be described, beginning with the point in the cycle when a carbon determination is about to begin.

(1) Relay 32 is energized to change amplifier gain from the low to the high-gain mode of operation. Simultaneously, a second set of contacts of relay 32 shorts the sensing coil 24a of meter 24 to prevent the meter from operating during the high-gain cycle.

(2) The differential thermocouples 42 and 44 at this point may have a small output voltage because of a small difference in temperature between the junctions. If this occurs, the thermocouple circuit must be balanced by the amplifier before the carbon determination begins. In the high-gain mode of operation, the amplifier drives servomotor 2 to reposition the slider of 10-turn potentiometer 40. At some position of the slider, a null point will be detected, corresponding to a balanced thermocouple bridge. Balancing of the thermocouple circuit is essential for accurate determination of carbon levels.

(3) After the thermocouple circuit is rebalanced, relay 32 drops out, changing amplifier gain to the low-gain mode. The meter 24 now becomes active. The meter 24 has a zero-center scale, with left-hand and right-hand locking contacts 1 and 2.

(4) When thermocouple causes the combustion front, an unbalanced voltage appears at the input to the amplifier. This signal is amplified and fed to the output stage. Triodes 8 and 10 conduct, producing an output voltage which is detected by the sensing coil 24a of meter 24. When the resistor network 11a is unbalanced sufficiently, the lower-limit contact 1 of 24 engages, locking in relay 26 and starting a counter (not shown) which registers weight percent C.

(5) The combustion front passes 42 and approaches thermocouple 44. Polarity of the input signal thus changes as 44 now sees a higher temperature than 42 and the amplified signal causes output triodes 6 and 12 to conduct. Triodes 8 and 10 are virtually at cut off. The output signal of resistor network 11a then drives the meter contact arm 3 up-scale until the upper limit contacts 2 engage, thus completing the measurement.

In FIG. 3, the components in the amplifying section, with the exception of the additional cathode resistor 16, are those found in Brown amplifiers. The value of the components in the circuitry of the embodiment described in FIG. 3 are as set forth below:

| Component: | Value |
| --- | --- |
| Resistors 14, 16 | 150 ohms. |
| Resistors 18, 28 | 4K ohm nominal precision 1%. |
| Meter 24 | Assembly Products Co., Model 455–C, range +2.5 mv.–0–(–2.5 mv.). |
| Relays 22, 26 | Potter-Brumfield, Model KCP11, 10K ohm coil. |
| Relay 32 | Potter-Brumfield, Model KR–4335. |
| Potentiometers 20, 40 | Standard 10 turn potentiometer (500 ohm resistor). |
| Resistor 30 | 100 ohms. |
| Resistor 34 | 200K ohms. |
| Resistor 36 | 300K ohms. |
| Variable resistor 38 | 500K ohms. |
| Thermocouples 42, 44 | Chromel-Alumel. |

Obviously many alternatives, modifications and variations will be apparent to those skilled in the art. However, it is intended that these alternatives, modifications, and variations as fall within the spirit and broad scope of this invention, as well as to embrace all other uses for the inventive apparatus, fall within the scope of the appended claims.

I claim:

1. A control apparatus comprising:
    signal generating means operable at a balanced state to provide a zero signal and at an unbalanced state to provide a low-level signal;
    means for amplifying said low-level signal, said amplifying means being operable between a high-gain state wherein said low-level signal is greatly amplified and a low-gain state wherein said low-level signal is moderately amplified;
    means coupled to said amplifying means and said signal generating means which in response to the high-gain amplified signal balances said signal generating means so that a zero signal is provided;
    means coupled to said amplifying means which in response to the low-gain amplified signal provides a control function; and
    means for switching said amplifying means between said high and low-gain states.

2. The apparatus defined in claim 1 wherein:
    (a) said signal generating means is a thermocouple;
    (b) said amplifying means is a servo-amplifier;
    (c) said balancing means is a servomotor; and
    (d) said control function means is a meter having relay means associated therewith.

3. A control apparatus comprising:
    thermocouple means operating at a balanced state when temperature conditions are constant to provide a zero signal, and operating at an unbalanced state when temperature conditions are changing to provide a low-level control signal;
    servo-amplified means for amplifying said low-level control signal, said servo-amplifier means including a pair of triodes having interconnected cathodes;
    means connecting said thermocouple means and said servo-amplifier means which switch said amplifier means between a high-gain state, whereby said control signal is greatly amplified, and a low-gain state, whereby said control signal is moderately amplified;
    servomotor means connected between said servo-amplifier means and said thermocouple means which in response to a high-gain amplified control signal balances said thermocouple means so that said zero signal is provided; and
    meter means connected across said triodes through limiting resistor means which in response to a low-gain amplified control signal provides a control function, said meter means including relay means which are operable between two positions corresponding to changing temperature conditions and which are actuated by said low-gain amplified control signal.

4. The control apparatus defined in claim 1 wherein the means for amplifying the low-level signal is a servo-amplifier including a pair of triodes having interconnected cathodes, and the control function means include meter relay means connected across said cathodes, said meter relay means being actuated by the low gain amplified signal.

5. The control apparatus defined in claim 4 wherein said relay means is operable between two different positions in accordance with the polarity of the signal.

6. The control apparatus defined in claim 5 wherein said meter means is connected across said cathodes by a resistor network.

References Cited

UNITED STATES PATENTS

| 2,436,444 | 2/1948 | Merrick | 324—157 X |
| 2,861,140 | 11/1958 | Woodall et al. | 324—157 X |
| 2,426,508 | 8/1947 | Isserstedt. | |
| 2,659,848 | 11/1953 | Mouzon. | |
| 2,728,039 | 12/1955 | Dueringer. | |
| 2,744,227 | 5/1956 | Spindler. | |
| 3,005,156 | 10/1961 | Hoberman | 324—123 X |
| 3,252,086 | 5/1966 | Lundstrom | 324—123 X |

FOREIGN PATENTS 679,495   9/1952   Great Britain.

THOMAS E. LYNCH, Primary Examiner

U.S. Cl. X.R.

318—28; 324—123